United States Patent
Nootbaar et al.

(10) Patent No.: US 6,416,604 B1
(45) Date of Patent: Jul. 9, 2002

(54) ADHESIVE TAPE AND ITS USE

(75) Inventors: Jens Nootbaar; Günter Aster, both of Hamburg; Uwe Wienberg, Uetersen, all of (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/345,081

(22) Filed: Jun. 30, 1999

(30) Foreign Application Priority Data

Jul. 9, 1998 (DE) .......................... 198 30 673

(51) Int. Cl.⁷ .............................. B65H 19/18; C09J 7/02
(52) U.S. Cl. ...................... 156/157; 156/504; 242/555; 242/556.1; 428/41.7; 428/354
(58) Field of Search ................... 156/157, 159, 156/502, 504, 505; 242/551, 555, 555.4, 555.5, 555.6, 556.1, 556; 428/40.1, 41.7, 41.8, 354

(56) References Cited

U.S. PATENT DOCUMENTS

| | | | | |
|---|---|---|---|---|
| 2,149,832 A | * | 3/1939 | Bernard | 242/556.1 |
| 2,149,833 A | * | 3/1939 | Bernard | 242/556.1 |
| 3,915,399 A | * | 10/1975 | Kron et al. | 156/502 X |
| 4,359,502 A | * | 11/1982 | Caponigro et al. | 428/354 X |
| 5,212,002 A | * | 5/1993 | Madrzak et al. | 428/354 X |
| 5,275,344 A | * | 1/1994 | Ray | 156/504 |
| 5,348,793 A | * | 9/1994 | Stettner | 428/354 X |
| 5,356,496 A | * | 10/1994 | Lincoln et al. | 156/159 X |
| 5,692,699 A | * | 12/1997 | Weirauch et al. | 242/556.1 |
| 5,804,302 A | * | 9/1998 | Tamura et al. | 428/354 |
| 5,901,919 A | * | 5/1999 | Wienberg | 242/556.1 |
| 5,916,651 A | * | 6/1999 | Wienberg et al. | 428/40.1 |
| 5,996,927 A | * | 12/1999 | Weirauch et al. | 242/556.1 |

* cited by examiner

*Primary Examiner*—Mark A. Osele
(74) *Attorney, Agent, or Firm*—Norris McLaughlin & Marcus

(57) ABSTRACT

Adhesive tape for the flying splice in paper finishing machines or the like having a paper backing and a water-soluble self-adhesive composition, the paper backing (2) being coated on both sides with a water-soluble self-adhesive composition (3, 3a), and an edge region of the reverse face of the adhesive tape (1) being equipped with a single-sided adhesive tape (6) which in turn has a readily splicing paper backing (7) which is equipped in turn with water-soluble self-adhesive composition (9).

6 Claims, 1 Drawing Sheet

ADHESIVE TAPE AND ITS USE

The invention relates to an adhesive tape for the flying splice (flying roll change) in paper finishing machines, rotary printing machines and the like, and to its use accordingly.

Flying splice in papermaking factories or the like is a common technique for replacing an old, almost fully unwound roll of paper by a new roll without having to stop the machines, which run at high speed. This is done using double-sided self-adhesive tapes, known as splicing tapes, which firstly are of high adhesion and high tack but secondly, because of their water-soluble self-adhesive compositions and paper backings, do not interfere with the re-use of paper wastes in the papermaking machine. These splicing tapes are bonded artistically in a zigzag form to the beginning of the web, a procedure requiring experienced personnel, with only about 4–5 minutes remaining for the entire procedure, owing to the high speed of the machines.

Although this technology is well established, it is not without certain disadvantages. Thus experienced personnel are required, the procedure is intrinsically hectic, and the bonds are also relatively thick, since in each case two plies of paper and the adhesive splicing tape in between are the result: a result which is unwanted in the paper industry.

There are various products on the market, known as splicing tapes, for this "butt splicing" in flying splice, which in addition to a paper backing comprise a water-soluble self-adhesive composition coated on both sides. Adhesive tapes of this kind are marketed inter alia under the name tesafix (Beiersdorf).

Also known from EP 418 527 A2 is a method of preparing a roll of printed web material in a roll changer of a rotary printing machine, in which use is made of adhesive strips that are divided into three zones (column 3, line 12 et seq. and FIGS. 1 and 2), the middle zone 6 being perforated. Tearing then takes place at this perforation (column 3, line 35).

Furthermore, DE 40 33 900 A1 discloses an adhesive tape which is suitable for an abovementioned splice and which has greatly differing bond strengths on opposing sides, so that it adheres preferentially to the drum in the course of tearing off (cf. column 2 line 17 et seq.).

In practice, however, such adhesive tapes have serious disadvantages, especially as a result of adhesive areas present following the splice.

Figure 3:
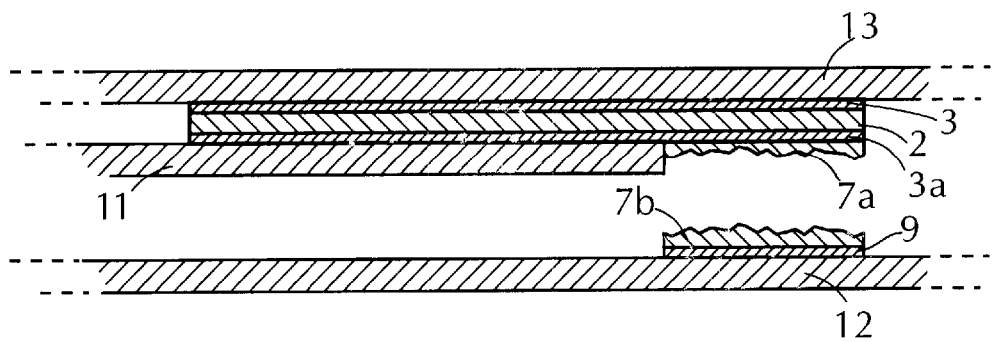

However, DE 196 28 317 A1 has already disclosed an adhesive tape for such applications, in which following the splice there are no longer any adhesive surfaces by virtue of the fact that in that case use is made of a readily splicing paper backing 7 which splits on splicing and following the splice masks the adhesive compositions 8 and 9; cf. FIG. 3. DE 196 32 689 A1 discloses a similar adhesive tape for this application, although in this case a readily splicing paper backing is employed which splits over the entire width of the adhesive tape; cf. in particular FIG. 3.

Nevertheless, even adhesive tapes of this kind have their disadvantages. When an adhesive tape according to DE 196 28 317 is applied it is found problematic that the end of one roll of paper (referred to as 11 in FIG. 2) retains play because the adhesive tape with its self-adhesive composition 9 is either not yet bonded to the underlying paper web, or the adhesive tape, initially bonded to the lower web, is not yet bonded with the uppermost web, or else, even after complete bonding has taken place, the tape can still easily lift off out from the lower web and in doing so may damage the readily splicing paper backing 7 before the actual splice is attached.

In the case of an adhesive tape in accordance with DE 196 32 681, a weak point is evident in particular at the point where, following the splice, the old and the new webs are joined (roughly in the left-hand third of FIG. 3); at this point, it is then easy for a tear to appear, and the splice is therefore unsuccessful.

A further disadvantage in the case of adhesive tapes according to DE 196 28 317 and DE 196 32 681 is that they have to be bonded under the topmost paper web of a bale. This proves difficult in practice, and in particular is poorly suited to automated attachment, with the aid of a machine, an applicator or the like. Topside bonding instead of underneath bonding is also desirable.

The object of the invention was to remedy this situation and, in particular, to avoid the disadvantages of the prior art or at least to alleviate them in a manner sufficient for practical purposes.

The invention accordingly provides an adhesive tape as characterized in more detail in the claims. Advantageous embodiments are indicated in the subclaims.

With the adhesive tape of the invention, outstanding splice results are obtained and, in particular, a considerable improvement is achieved over a tape according to DE 196 28 317.

This becomes particularly marked when using an adhesive tape of the invention on a roll of paper which has been prepared for the splice but which still, so to speak, has to wait. In this case the upper release paper, with the adhesive tape stuck on, can remain on the adhesive tape until shortly before the ultimate use of the roll; in this case an outstandingly fixed assembly is present, with an over-bonded attachment instead of an under-bonded one. This securement remains in place even in the course of prolonged storage of such a roll or, for instance, when the roll is treated at another site and transported.

The invention additionally provides a method using adhesive tapes of this kind, namely a method of flying splice in a paper finishing machine or the like, using an adhesive tape having a paper backing and a water-soluble self-adhesive composition, employing an adhesive tape according to one of the claims and thus bonding the topmost web of paper to the top of part of a new roll of paper.

Preference is given in this context to this method such that the lower liner is first of all peeled away and the adhesive tape (1) is bonded to the topmost paper web of a new roll of paper, with the exposed portion of the self-adhesive composition 3a, while the lower adhering portion of the adhesive tape (6) is bonded to the roll of paper in front of the edge of the topmost paper web.

In accordance with the invention, the paper industry is enabled to depart from the butt splicing technique used to date without giving up its advantages.

Indeed, on technical grounds and also for reasons of rationalization it is desirable to depart from the known technique of butt splicing with double-sided reprocessible adhesive (splicing) tape in the course of automatic roll changing on coating units. It is now possible to switch to a single-sided, reprocessible adhesive tape, with considerable advantages.

In this bonding technique with an adhesive tape of the invention, an advantageous procedure is to bond the underside of the topmost paper ply (untreated paper) with a double-sided, lined, reprocessible adhesive tape about 120 mm in width (diagonally to the machine direction).

The double-sided adhesive tape with the open adhesive-tape side outwards is now available for actual splicing, if any liner present is removed.

When accelerating the paper wind it is necessary to hold the start of the paper (bonding side) fast with the aid of a double-sided adhesive tape (reprocessable). Particularly suitable in this context is a tesafix equipped with a readily splitting paper backing.

The double-sided adhesive splicing tape is now fastened to the next paper ply with the aid of this double-sidedly adhesive, readily splitting tesafix.

Suitable readily splicing/spliffing paper backings are those which, when used in accordance with the invention in an adhesive tape, splice/split in the course of the splice carried out with them: the paper tears in the direction of its plane. A simple manual test can be used to determine suitable paper backings: the paper is coated on both sides with a strongly adhesive self-adhesive composition, as is prior art. A strip of such a splicing tape (double-sided adhesive tape) is then bonded between two sheets of writing paper and the sheets are torn apart sharply, vertically with respect to the plane of the sheets. In the course of this procedure, a readily splicing paper backing will split in the plane of the paper, the fragments bonded to the sheets each being covered, on their now exposed rear face, with the residues or part-layers of the split paper backing. A paper backing of this kind is suitable for the invention. In the case of a paper backing which is not readily splicing, the bonded sheets tear while the bond remains intact. A paper backing of this kind is not suitable for the present invention. Therefore, in so far as no sufficient information relating to the splice readiness or splittability of a paper can be obtained from the paper manufacturer, this test can be used to give information rapidly and simply.

In order to prevent the penetration of air when accelerating the paper wind (currently to about 1600 m/min), it is advantageous to bond a strip transversely over the entire paper web.

The advantages achieved in accordance with the invention lie in particular in the fact that, on splicing, the bonding site is located between the topmost paper web of the roll of paper and the paper web of the expiring roll of paper. This ensures a secure transfer of the web tension from the expiring paper web to the topmost paper web.

Figure 1:
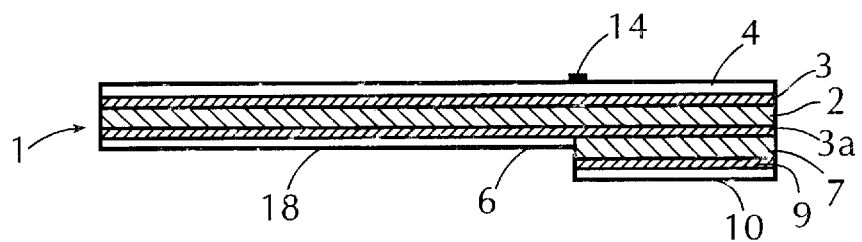
Figure 2:
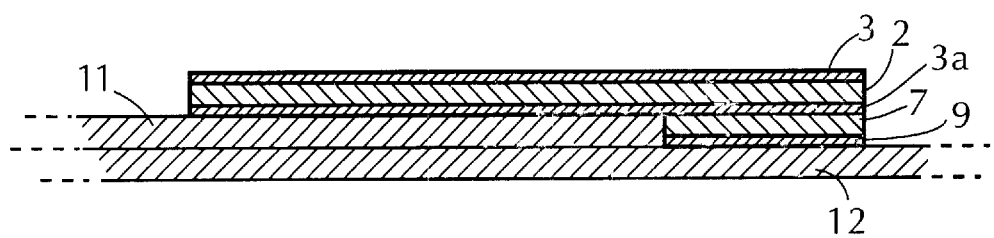

In the text below the intention is to describe the invention in more detail with reference to an exemplary embodiment, without wishing thereby to restrict it unnecessarily. In the drawings:

FIG. 1 shows a lateral, schematic view of an adhesive tape according to the invention, FIG. 2 shows a lateral, schematic view of an adhesive tape according to FIG. 1, bonded to a roll of paper and ready for a flying splice, and FIG. 3 shows a view according to FIG. 2 but after flying splice has taken place.

In detail, FIG. 1 shows an adhesive tape 1 having a backing 2 made of crepe paper, coated on both sides with a water-soluble self-adhesive composition 3/3a. The overall thickness of the backing 2 plus self-adhesive composition 3/3a is 0.085 mm, its width is 150 mm, and it is marketed as tesafix 51914 (Beiersdorf, Germany). The self-adhesive composition 3 is lined with a siliconized release paper 4. At the right-hand end of the adhesive tape 1 a single-sided adhesive tape 6 is bonded underneath, consisting of a readily splicing paper backing 7 coated on one side with water-soluble self-adhesive composition 9, and lined with a siliconized release paper 10. The adhesive tape 6 has a width of 9 mm.

FIG. 2 shows how such an adhesive tape 1 is bonded to a paper web 11, namely by the left-hand portion. The release papers 10 and 18 have also been peeled away from the underside of the under-bonded adhesive tapes 6 and, 14, and the self-adhesive composition 9 thereby exposed is bonded to the paper web 12 of a roll of paper, this web lying below the paper web 11. The release paper 4 has also been peeled away, so that the roll of paper thus equipped is ready for a flying splice, the bond of the adhesive tape 1 extending obliquely over the roll, in order to avoid a jerk at the moment of the flying splice.

The self-adhesive composition 3 is now exposed and is ready for this flying splice, in a width of 120 mm and over the entire width of the roll of paper.

The (new) roll of paper thus equipped is placed adjacent to the unwound (old) roll of paper to which the new roll is to be attached and is accelerated to the same rotational speed as the said old roll. When this has been done, the change can be executed: the new roll is brought up against the old one, the self-adhesive composition 3 is bonded, in accordance with FIG. 3, with the paper web 13 of the old roll, while the readily splicing paper backing 7 splices in such a way that portion 7a remains on the adhesive tape 1, where it covers the self-adhesive composition 3, while the other portion 7b remains on the self-adhesive composition 9, which bonds to the paper web 12. Therefore, both self-adhesive compositions 3 and 9 are to a certain extent neutralized, no longer adhere, and thus do not disrupt the subsequent process in the paper machines.

In accordance with a further embodiment, an application aid is arranged on the upper face of the release paper 4, the said aid being in particular in the form of a printed line 14 (FIG. 1), in order to facilitate the precise placement of the adhesive tape 1.

What is claimed is:
1. An adhesive splicing tape comprising:
 a) a double-sided adhesive tape comprising:
  i) a paper backing;
  ii) a first water-soluble self-adhesive layer on one side of said paper backing;
  iii) a second water-soluble self-adhesive layer covering the entirety of a second side of said paper backing; and
 b) a single-sided adhesive tape adhered to an edge region of said second water-soluble self-adhesive layer, said single-sided adhesive tape comprising:
  i) a cleavable paper backing adhered on one of its sides to said second water-soluble self-adhesive layer; and
  ii) a third water-soluble self-adhesive layer on a side of said cleavable paper backing opposite that which is adhered to said second water-soluble self-adhesive layer; whereby said cleavable paper backing, when the adhesive splicing tape is adhered between a new roll of paper and an old roll of paper, both of which are in motion, will cleave in two portions between said second water-soluble self-adhesive layer and said third water-soluble self-adhesive layer such that a first portion of said cleavable paper backing will continue to adhere to and cover said second water-soluble self-adhesive layer and a second portion of said cleavable paper backing will continue to adhere to and cover said third water-soluble self-adhesive layer.

2. The adhesive splicing tape according to claim 1, which further comprises a liner covering each of said self-adhesive compositions.

3. The adhesive splicing tape according to claim 1, wherein the double-sided adhesive tape is from 60 to 150 mm in width while the single-sided adhesive tape is from 4 to 20 mm in width.

4. The adhesive splicing tape according to claim 3, wherein the single-sided adhesive tape is 5 to 10 mm in width.

5. The adhesive splicing tape according to claim 1, wherein an edge of said double-sided adhesive tape is arranged parallel to an edge of said single-sided adhesive tape.

6. A method of splicing a new roll of paper to an unwinding old roll of paper, said method comprising the following steps:

a) providing an adhesive tape according to any one of claims 1–5;

b) adhering said second water-soluble adhesive layer to an outer surface of a topmost web of said new roll of paper;

c) adhering said third water-soluble adhesive layer to an outer surface of an underlying web of said new roll of paper;

d) accelerating said new roll of paper to the same speed as said unwinding old roll of paper; and e) pressing the new roll of paper against said unwinding old roll of paper to splice said new roll of paper to said unwinding old roll of paper.

* * * * *